United States Patent [19]

Kinsey et al.

[11] Patent Number: 4,718,920
[45] Date of Patent: Jan. 12, 1988

[54] METHOD AND APPARATUS FOR SMOKE SUPPRESSION

[75] Inventors: John S. Kinsey, Lee's Summit; Frank J. Pendleton, Kansas City, both of Mo.

[73] Assignee: Midwest Research Institute, Kansas City, Mo.

[21] Appl. No.: 853,707

[22] Filed: Apr. 18, 1986

[51] Int. Cl.$^4$ .............................................. B03C 3/16
[52] U.S. Cl. ................................. 55/10; 55/107; 239/3; 239/403; 239/703
[58] Field of Search ............... 55/10, 107; 239/3, 700, 239/703, 704, 214.13, 214.25, 240, 403

[56] References Cited

U.S. PATENT DOCUMENTS

| | | | |
|---|---|---|---|
| 1,255,592 | 2/1918 | Fesler | 239/214.13 |
| 1,492,986 | 5/1924 | Hurd | 239/214.13 |
| 2,922,584 | 1/1960 | Slatkin | 239/3 X |
| 2,998,230 | 8/1961 | Perretti | 239/214.25 X |
| 3,000,574 | 9/1961 | Sedlacsik, Jr. | 239/703 |
| 3,048,498 | 8/1962 | Juvinall et al. | 239/3 X |
| 3,148,831 | 9/1964 | Point . | |
| 3,958,959 | 5/1976 | Cohen et al. | 55/10 |
| 4,541,844 | 9/1985 | Malcolm | 55/10 |
| 4,619,670 | 10/1986 | Malcolm et al. | 55/107 |
| 4,671,805 | 6/1987 | Gourdine | 55/10 |

Primary Examiner—Kathleen J. Prunner
Attorney, Agent, or Firm—Kokjer, Kircher, Bradley, Wharton, Bowman & Johnson

[57] ABSTRACT

A method and apparatus for suppressing smoke employs a fine spray of water droplets that are electrically charged opposite to the charge of soot particles in the smoke. A hand held housing contains a rotary shaft which carries a cup that spins within an air nozzle when the shaft is rotated. Electrically charged water is applied to flared inside surface of the cup and moves by centrifugal action to an annular lip on the end of the cup. An air driven turbine drives the shaft, and the compressed air used to power the turbine is passed through the nozzle where it helps to atomize and spray the water discharging from the lip on the spinning cup. The entire metal assembly within the insulated housing is maintained at a high electrical potential to effectively charge the water.

20 Claims, 3 Drawing Figures

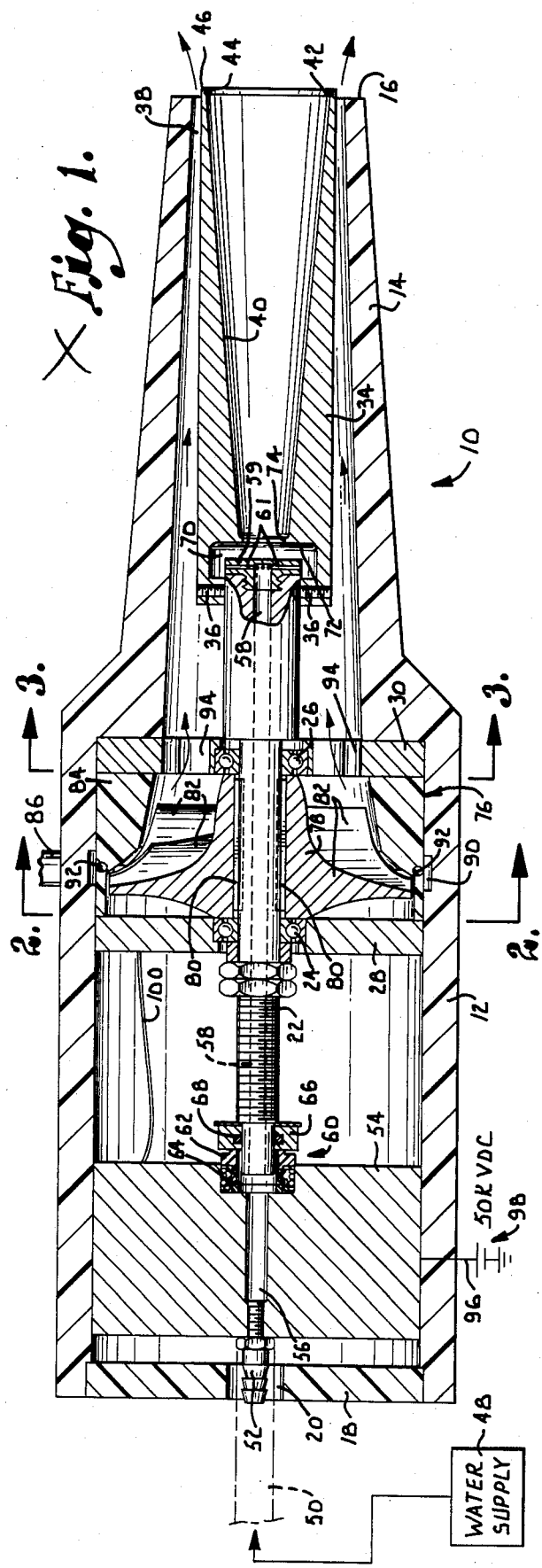
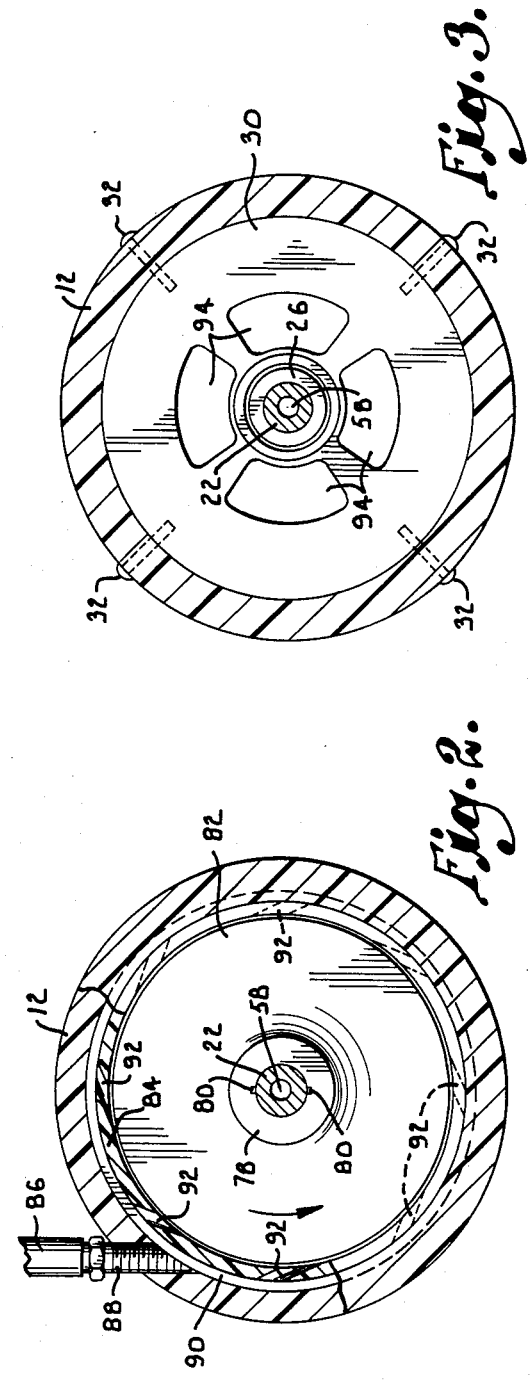

METHOD AND APPARATUS FOR SMOKE SUPPRESSION

This invention was made with Government support under Contract No. N00014-84-C-2189, awarded by the Naval Research Laboratory. The Government has certain rights in this invention. Government has certain rights in this invention.

BACKGROUND OF THE INVENTION

This invention relates to a method and apparatus for producing a spray of fine electrically charged liquid droplets and applying the spray primarily for the purpose of suppressing smoke.

One of the principal impediments both to the fighting of fires and the escape of potential fire victims is the presence of smoke which is typically created in dense black clouds when the fire occurs in an enclosed area such as a building. The smoke quickly fills corridors, passageways, hallways and other areas in the building and provides a severe restriction on the visibility of those attempting to flee the fire and to firefighters attempting to locate and extinguish the fire. It is also well known that smoke is dangerous to persons exposed to it and that it can cause extensive property damage.

Smoke from the uncontrolled burning of a hydrocarbon fuel or other combustible material is created by a combination of thermal degradation (pyrolysis) and incompleted combustion which produces an aerosol of carbonaceous particulate matter commonly known as soot. In flames where ventilation is limited, such as those found in accidental fires in buildings, partially oxidized gases and condensed phase products are formed, and this creates dense black smoke and soot. The soot particles are initially very small (less than about 20 Angstroms in diameter), and these particles later coagulate to form chain like agglomerates or clusters. Because of the ionizing environment in the high temperature flame zone, the soot particles usually acquire a positive electrostatic charge.

We have found that if small water droplets having an opposite or negative charge are injected into the smoke, even the smaller soot particles less than 1-2 microns can be captured and removed from the aerosol cloud. A combination of the physical mechanisms of impaction, phoretic forces and electrostatic attraction cause the soot particles to collect on the droplets which subsequently settle to the floor under the influence of gravity. As a result, the smoke is suppressed and visibility is greatly improved.

In the past, electrostatically charged liquid droplets have been used for a variety of purposes, including the spraying of paint and other coatings, the application of pesticides, and in gas cleaning equipment. Recent environmental concerns have also led to investigations of the ability of charged fog to remove suspended particles that are generated by industrial processes. In the equipment that has been developed for the generation of charged fogs, the electrostatic charge is imparted to the droplets in one of three ways: by ionized field charging (also referred to as ion attachment charging), by induction charging, or by contact charging. Ionized field charging involves the use of a corona to create a flow of ions which attach to the liquid droplets as they pass through the region near the electrode. Induction charging relies on a uniform electric field around the spray to transfer or induce a charge on the droplets. Contact charging is carried out by directly connecting the atomizer to a source of high electrical potential which charges the droplets as they are formed.

The technology of electrostatic fogging devices has been at least partially adapted from that of conventional sprayers. One known device uses an off the shelf spray nozzle in combination with an induction charging system which surrounds the nozzle with a metal ring connected to a source of high potential. This device is subject to clogging of the nozzle in situations where the water supply contains a high concentration of suspended solids, and its use of induction charging results in a significant electrical charge being applied only to the droplets located on the outside of the conical spray pattern in heavy sprays. The remaining droplets are only charged by natural processes and thus are unable to make best use of electrostatic attraction which is critical to effective capture of particulate matter.

Another known device, described in pending patent application U.S. Ser. No. 341,861, filed on Jan. 22, 1982, uses an electric motor, a fan, and contact charging to create a spray of electrified water droplets intended for use in the suppression of industrial emissions. Although this type of electrostatic fogger functions in a generally satisfactory manner for its intended purpose, it is not suited for use in suppressing smoke which is generated by accidental fires. The presence of a motor and fan in the device makes it too heavy and bulky to be conveniently transported and handled by firefighters. Moreover, two sources of electrical power are required, one to supply the AC motor and another to supply the high voltage DC that is required to charge the water. Another problem is that a single electrode in the water line is provided, and it serves essentially as a point source which is inefficient in applying a high electrical charge to the water.

SUMMARY OF THE INVENTION

The present invention is directed to an improved electrostatic spray device which is particularly well suited for suppressing smoke. The invention is also directed to a novel method of removing small particulate matter from smoke through the use of an electrostatically charged spray of fine water droplets.

It is an important object of the invention to provide a smoke suppression device which produces a spray of extremely fine electrically charged water droplets. The droplets are in the general range of 10-100 microns in diameter and have a mean diameter of about 47 microns, which is a spectrum that has been found to be particularly effective in removing fine soot particles (1-2 microns) from smoke clouds, as well as in other applications.

Another important object of the invention is to provide a smoke suppression device that produces a spray in which the droplets have a high charge to mass ratio. Their small size enhances the ability of the droplets to effectively mingle with the small soot particles, while their high electrical charge allows them to take full advantage of electrostatic attraction to collect and remove suspended smoke particles.

A further object of the invention is to provide a device of the character described which is able to spray the electrically charged droplets a considerable distance in a consistent spray pattern.

An additional object of the invention is to provide a device of the character described which makes use of compressed air both to drive the atomizing cup and to help break the liquid up into fine droplets. The compressed air that is necessary to help atomize the liquid is also used to drive the atomizing cup, thus taking full advantage of the compressed air to perform dual functions that would otherwise require two separate sources of energy.

A still further object of the invention is to provide a device of the character described which is small and light in weight so that it can be easily transported and handled when used to suppress smoke and for other purposes.

Yet another object of the invention is to provide an effective method of suppressing smoke by treating it with a spray of fine water droplets having a high charge to mass ratio for effective removal of particulate matter from the smoke.

DETAILED DESCRIPTION OF THE INVENTION

In the accompanying drawing which forms a part of the specification and is to be read in conjunction therewith and in which like reference numerals are used to indicate like parts in the various views:

FIG. 1 is a sectional view of a smoke suppression device constructed according to a preferred embodiment of the present invention;

FIG. 2 is a sectional view taken generally along line 2—2 of FIG. 1 in the direction of the arrows, with a portion broken away for purposes of illustration; and FIG. 3 is a sectional view taken generally along line 3—3 of FIG. 1 in the direction of the arrows.

Referring now to the drawing in more detail, numeral 10 generally designates a device which produces a fine spray of electrically charged water droplets used primarily for the suppression of smoke. The device 10 has a generally cylindrical casing or housing 12 which is formed from a plastic material or another suitable material having good electric insulating properties. Formed integrally on the forward end of housing 12 is a frustoconical air nozzle 14 which is open on its forward end 16. The nozzle 14 gradually tapers as it extends toward the open end 16. A circular end cap 18 covers the opposite or rearward end of the housing 12. The end cap 18 is constructed of a suitable plastic having electrical insulating properties, and it is provided with an opening 20 in its center.

An elongate metal shaft 22 is supported for axial rotation in the housing 12. Shaft 22 extends along the longitudinal center line of housing 12 and nozzle 14 and is supported for rotation by a pair of bearings 24 and 26. The bearings are preferably precision, sealed ball bearings, and they are pressed into respective stainless steel plates 28 and 30. As shown in FIG. 3, four nylon screws 32 are extended through the housing 12 and are threaded into the periphery of each plate 28 and 30 in order to hold the plates in place in the housing. The forward plate 30 is located adjacent to the end of nozzle 14, while the rear plate 28 is spaced behind and is parallel to plate 30.

On its forward end, shaft 22 carries a brass cup 34 which is located within the nozzle 14. A pair of set screws 36 are used to secure cup 34 on the end of shaft 22. The outside surface of cup 34 flares outwardly as it extends forwardly, and the cup is spaced inwardly from the inside surface of nozzle 14 in order to form an annular air channel 38 between the nozzle and cup. The air channel 38 is gradually reduced in size as it extends toward the forward or discharge end 16 of the nozzle.

Cup 34 has a frustoconical inside surface 40 which flares as it extends forwardly toward the forward end 16 of the nozzle. The flared surface 40 is preferably smoothly polished, and it terminates in an annular lip 42 located on the forward end of cup 34. The lip 42 includes a beveled surface 44 which flares outwardly at a more extreme angle than surface 40 and which terminates in a sharp circular edge 46 which is adjacent to the forward end 16 of nozzle 14. The annular air channel 38 surrounds lip 42 at its open discharge end.

Water is supplied to the device 10 from a water supply 48 which is electrically isolated from ground potential. Water is pumped or otherwise delivered from the water supply 48 through a supply line 50 which extends through opening 20 and connects with a metal fitting 52. The end of fitting 52 is threaded into a thick metal disk 54 which is located within the housing 12 of the device. The disk 54 may be held in place by nylon screws such as the screws 32 shown in FIG. 3.

Disk 54 has a central passage 56 which receives water from fitting 52 and delivers the water to the inlet end of an internal passage 58 which extends axially the entire the length of shaft 22. A water seal 60 provides a dynamic seal between the stationary disk 54 and the rotating shaft 22. The seal 60 includes a spring loaded wear ring 62 which is urged by a spring 64 against another ring 66 carried on the end of shaft 22. An O ring 68 carried by ring 66 provides a seal against the outside surface of shaft 22.

The opposite or outlet end of the axial passage 58 terminates in an annular enlargement or disc 59 in a liquid collection chamber 70 formed in the brass cup 34 adjacent to the end of the flared surface 40. Disc 59 is attached to the end of shaft 22 and closes the end of passage 58 in chamber 70. A plurality of peripherally spaced apart small bores 61 extend radially through disc 59 and communicate passage 58 with chamber 70 for liquid to flow from the passage into the chamber. In the presently preferred embodiment of the invention, eight such bores are provided at uniformly spaced intervals around the disc.

A flat annular surface formed internally on cup 34 provides a weir 72 which extends from the outside wall of the collection chamber 70 to the end of the flared surface 40. A lip 74 is formed at the intersection between the weir 72 and surface 40.

Housed between plates 28 and 30 is an air driven turbine which is generally designated by numeral 76. The turbine 76 has an impeller 78 which is mounted on shaft 22 by a pair of keys 80. Impeller 78 has a plurality of vanes 82 which turn the impeller when air is directed against them. The impeller 78 is located within a housing 84 for the turbine. The housing 84 extends around the inside surface of the outer housing 12 at a location between plates 28 and 30.

Compressed air which serves to drive the turbine 76 is supplied from a suitable compressed air source (not shown) to a flexible air line 86. The air source can be an air compressor or compressed air tank. Line 86 connects with a fitting 88 (See FIG. 2) which is threaded through the outer housing 12. The inside surface of housing 12 is provided with an annular groove 90 which receives air from fitting 88. Extending through the turbine housing 84 are a plurality of angled air passages 92 having their inner or discharge ends located adjacent to the vanes 82 of the turbine impeller. The air passages 92 are spaced equidistantly from one another around the turbine housing, and their angled orientation results in the compressed air being applied generally tangentially to the vanes 82.

The forward bearing plate 30 is provided with a series of openings 94 which provide the air with access from the inside of the turbine housing 84 to the nozzle 14. The air which is exhausted from the turbine 76 flows through the openings 94 and into nozzle 14 where the air is then directed through the air channel 38 prior to being discharged from the device.

The entire metal assembly which is housed within the electrically insulated housing 12 is maintained at an elevated electrical potential by a conductor 96 which connects with disk 54. A source 98 of direct current power connects with line 96. Preferably, the source 98 is a 50 or 60 kilovolt source of power which is able to maintain the metal assembly of the device constantly at an elevated potential of about 50-60 kilovolts. Internal connections such as the wire 100 are provided to make certain that the metal parts within housing 12 are all electrically connected with one another, especially the metal shaft 22 and the brass cup 34. The conductor 96 may extend into housing 12 through the opening 20 in end plate 18.

In operation, the compressed air which is applied to vanes 82 causes impeller 78 to rotate at a high rate of speed, and this in turn rotates shaft 22 and the brass cup 34 at a high speed. With compressed air applied at approximately 165 psig, shaft 22 is turned at approximately 25,000 RPM. As the shaft and cup are rotated, water (or another liquid) is applied from the water supply 48 through line 50, fitting 52 and passage 56 to the inlet end of passage 58. The water flows through passage 58 along the entire length of shaft 22 and is discharged from the passage through the radial bores 61 into the collection chamber 70. The water which enters the collection chamber is urged outwardly by centrifugal force and eventually covers the entirety of weir 72 before it can flow past the weir. The weir 72 acts to accurately control the flow of liquid out of the collection chamber 70 and past lip 74 onto the flared surface 40 in a thin film. Due to the high rate at which cup 34 is spinning and the configuration of the flared surface 40, centrifugal force causes the water to flow forwardly and outwardly along surface 40 in a thin film which eventually reaches the lip 42.

Due to the elevated potential at which shaft 22 and cup 34 are maintained, the water is electrically charged as it flows through passage 58 and along surface 40. When the water reaches lip 42, it flows along the beveled surface 44 and reaches the circular edge 46 at which point the water is discharged from lip 42 and flows generally outwardly due to the centrifugal force. The water is thus discharged outwardly either in thin sheets as ligaments, or in individual drops across the outlet end of the air channel 38 through which the compressed air is flowing in a high velocity annular jet. The air jet impacts against the water sheets and ligaments and applies a shear force which breaks the water up into extremely fine droplets. The air stream additionally projects the droplets forwardly in a spray which is consistent and which is projected a considerable distance.

The device 10 is well suited for suppressing smoke and is light enough and small enough that it can be hand held and used by firefighters and others engaged in the suppression of smoke. To use the device for suppressing smoke, the spray is directed into the smoke and the fine water droplets in the spray mingle intimately with the particulate matter in the smoke. The small particles (1-2 microns) of soot are usually positively charged, and they are attracted to and collect on the negatively charged water droplets, along with larger particulate matter in the smoke cloud. The particles thus are removed from the smoke cloud as the droplets settle to the floor under the influence of gravity.

In this manner, the device 10 can be used to suppress smoke, and it also has use in other applications which required the application of a fine spray of electrostatically charged liquid droplets.

The weir 72 functions in an effective manner to maintain a consistent flow rate of liquid onto and along the flared surface 40 of cup 34. The metering function performed by the weir maintains a thin and uniform film of liquid on surface 40 so that the liquid is discharged in a thin and uniform sheet from lip 42. This decreases the size of the water droplets that are produced and maintains the size consistently within a relatively small range of 10-100 microns. The mean diameter of the water droplets that are produced is about 47 microns. It has been found that the presence of the weir decreases the particle size by a factor of nearly two. The small size of the water droplets not only makes them more effective in mingling with and collecting relatively small soot particles, but it also results in the droplets being projected well beyond the forward end of the device in a consistent spray pattern.

The water which flows through the device is maintained in contact with metal surfaces of shaft 22 and cup 34 for a relatively long duration. Since the shaft and cup are maintained at a high potential, the water droplets are highly charged by contact charging, and this, in combination with the relatively small size of the water droplets, results in a high charge to mass ratio of the droplets in the spray. For example, experimentation has shown that the results shown in the following table can be achieved with the device:

| RESULTS OF CHARGE TO MASS MEASUREMENTS | | | | |
|---|---|---|---|---|
| Applied Potential (kV) | Water Flow Rate to Fogger (L/min) | Total Charge Measured ($10^{-6}$ Coulombs) | Mass of Water Collected (grams) | Charge/Mass Ratio ($10^{-6}$ C/g) |
| 0 | 0.95 | 7.5 | 3.4 | 2.2 |
| −20 | 0.95 | 35.8 | 3.3 | 10.9 |
| −40 | 0.95 | 227 | 5.7 | 39.8 |
| −60 | 0.95 | 182 | 2.7 | 67.5 |

These results are to be compared with charge to mass ratios of no more than about 11 ($10^{-6}$ C/g) that are achieved with other known devices. Consequently, the charge to mass ratio of 67.5 which can be achieved with the subject device when a negative potential of 60 kilovolts is applied represents an improvement by a factor of more than 6. The improvement in the charge to mass ratio provides the device with the capability of removing more and smaller particles than has been possible with other known devices. The charge to mass ratio should be maintained at a level in excess of about $40 \times 10^{-6}$ Coulombs/gram in order for smoke to be effectively suppressed.

It is additionally pointed out that the device 10 is much lighter and less bulky than other devices that are known. For example, one known device weighs more than 100 pounds, whereas the present device weighs approximately 40 pounds so that it can be hand held by firefighters in the suppression of smoke. The preferred embodiment of the invention has a length of approximately fifteen inches and a diameter of approximately eight inches, and its relatively small size also lends itself well to handling for smoke suppression.

The air turbine 76 is particularly advantageous for driving of the atomizing cup 34 and uses for its motive power the compressed air that is already present because of its need for atomizing the liquid. The air turbine is also more amenable to being electrically isolated so that the device can be operated at the high potential required for a high charge to mass ratio of the droplets.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Apparatus for spraying electrically charged liquid droplets, said apparatus comprising:
- a housing;
- a shaft supported in said housing for rotation and presenting an axial liquid passage having an inlet at one end of the shaft and an outlet at the opposite end of the shaft;
- an air driven turbine mounted on said shaft for rotating the shaft when the turbine is driven;
- means for supplying liquid to the inlet end of said passage;
- means for electrically charging the liquid;
- a cup mounted on said opposite end of the shaft and presenting a flared surface located to receive liquid discharging from the outlet of said passage, said flared surface terminating in an annular lip on the cup;
- means for applying compressed air to said turbine for driving of the turbine to rotate said shaft and cup; and
- an air nozzle defining an annular air channel around said lip, said nozzle being disposed to receive the compressed air exhausted from said turbine and to direct the air at high speed through said channel and against the liquid discharging from said lip, whereby the liquid is atomized and projected in a spray of fine droplets.

2. Apparatus as set forth in claim 1, wherein:
- said shaft and cup are metal;
- said means for electrically charging the liquid comprises means for maintaining said shaft and cup at an elevated potential, whereby the liquid is charged in said passage and on said flared surface of the cup; and
- said housing is electrically insulated from the shaft and cup and has a size to be hand held.

3. Apparatus as set forth in claim 1, including a weir on said cup adjacent said surface for controlling the flow of liquid from said outlet to said flared surface in a manner to maintain the liquid on said flared surface in a thin, substantially uniform film moving toward the lip.

4. Apparatus as set forth in claim 3, wherein said lip has a beveled surface which flares outwardly from said flared surface and terminates in a sharp circular edge adjacent said air channel.

5. Apparatus as set forth in claim 1, including:
- a collection chamber in said cup for receiving and collecting liquid discharging from the outlet of said passage; and
- a weir on said cup adjacent said chamber for controlling passage of liquid onto said flared surface from said collection chamber, said weir and chamber being arranged to maintain the liquid on said flared surface in a thin, substantially uniform film moving toward the lip.

6. Apparatus as set forth in claim 5, wherein said lip has a beveled surface which flares outwardly from said flared surface and terminates in a sharp circular edge adjacent said air channel.

7. Apparatus as set forth in claim 1, wherein said air applying means is arranged to apply air to said turbine in a substantially tangential path.

8. Apparatus as set forth in claim 1, wherein:
- said turbine includes an impeller having a plurality of vanes;
- said turbine includes a housing around said impeller, said housing presenting a plurality of air passages oriented substantially tangential to said vanes; and
- said air applying means is arranged to supply compressed air to each of said air passages.

9. Smoke suppression apparatus comprising:
- a housing;
- a shaft supported for rotation in said housing;
- means for rotating said shaft;
- a cup mounted on said shaft for rotation therewith, said cup presenting a flared surface which terminates in an annular lip concentric with the axis of the shaft;
- means for supplying electrically charged water to said flared surface of the cup at a rate permitting the liquid to flow along said surface to said lip under the influence of centrifugal force;
- an air nozzle on the housing defining an annular air channel around said lip; and
- means for applying compressed air to said nozzle from a source external to said housing in a manner to pass the air at high speed through said channel and against the water discharging from said lip, thereby helping atomization of the water and projecting same in a spray of electrically charged droplets for capturing smoke particles.

10. Apparatus as set forth in claim 9, wherein said water supplying means comprises:
- an axial passage in said shaft having an outlet end opening into said cup and an inlet end opposite the outlet end;
- means for delivering water to said inlet end of the passage; and
- means for electrically charging the water in said passage.

11. Apparatus as set forth in claim 10, wherein:
- said shaft is metal;
- said housing is electrically insulated from the shaft and has a size to be hand held; and
- said electrical charging means comprises means for maintaining said shaft at an elevated electrical potential, whereby the water is electrically charged along the entire length of the passage.

12. Apparatus as set forth in claim 10, including:

a collection chamber in said cup for receiving and collecting liquid discharging from the outlet of said passage; and a weir on said cup adjacent said chamber for controlling passage of liquid onto said flared surface from said collection chamber, said weir and chamber being arranged to maintain the liquid on said flared surface in a thin, substantially uniform film moving toward the lip.

13. Apparatus as set forth in claim 9, including a weir on said cup at a location to control flow of water onto said flared surface in a manner to maintain the water on said surface in a thin, substantially uniform film moving toward said lip.

14. Apparatus as set forth in claim 9, wherein said shaft rotating means comprises an air driven turbine having an impeller mounted on the shaft at a location in the flow path of the compressed air applied to said nozzle, whereby the impeller is driven by the air to effect rotation of the shaft and the air exhausted from the turbine is applied to the nozzle.

15. A method of suppressing smoke containing smoke particles having a diameter less than about 2 microns, said method comprising spraying into the smoke a water spray of electrically charged water droplets having a diameter of approximately 10–100 microns and a charge to mass ratio greater than about $40 \times 10^{-6}$ Coulombs per gram.

16. The method of claim 15, wherein said spraying step comprises:

spinning a cup having a flared inside surface which terminates in an annular lip;

applying electrically charged water to said flared surface whereby centrifugal force moves the water along the surface for discharge therefrom at said lip; and applying a high velocity stream of air past said lip to help atomize the water discharging therefrom and project the droplets into the smoke in a fine spray.

17. The method of claim 16, wherein said step of applying a stream of air comprises directing compressed air along a prescribed flow path to an annular air channel surrounding said lip.

18. The method of claim 17, wherein said cup is carried on a rotary shaft and said spinning step comprises mounting an air driven turbine on the shaft at a location in said prescribed path to use the compressed air to drive the turbine.

19. The method of claim 18, wherein said shaft is metal and said step of applying water comprises:

delivering water axially through said shaft to said flared surface of the cup; and maintaining said shaft at an elevated electrical potential to electrically charge the water along the entire length of the shaft.

20. The method of claim 16, wherein said cup is carried on a rotating metal shaft and said step of applying water comprises:

delivering water axially through said shaft to said flared surface of the cup; and maintaining said shaft at an elevated electrical potential to electrically charge the water along the entire length of the shaft.

* * * * *